US012602841B2

(12) United States Patent
Chan et al.

(10) Patent No.: US 12,602,841 B2
(45) Date of Patent: Apr. 14, 2026

(54) HIGH DYNAMIC RANGE VISUALIZATIONS INDICATING RANGES, POINT CURVES, AND PREVIEWS

(71) Applicant: Adobe Inc., San Jose, CA (US)

(72) Inventors: Eric Chan, Belmont, MA (US); Thomas Frederick Knoll, Pacific Palisades, CA (US); Gregory Paul Zulkie, Brooklyn, NY (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/481,437

(22) Filed: Oct. 5, 2023

(65) Prior Publication Data

US 2025/0117977 A1    Apr. 10, 2025

(51) Int. Cl.
*G06T 11/00*        (2006.01)
*G06T 11/20*        (2006.01)

(52) U.S. Cl.
CPC .......... *G06T 11/001* (2013.01); *G06T 11/206* (2013.01); *G06T 2200/24* (2013.01)

(58) Field of Classification Search
CPC ................ H04N 5/57; H04N 21/4518; G09G 2320/0626; G09G 2320/0666; G06T 5/00; G06T 5/54; G06T 5/90; G06T 5/92; G06T 5/94; G06T 11/001; G06T 11/206; G06T 2200/24; G06T 2207/20208
USPC ........................................................ 345/589
See application file for complete search history.

(56) References Cited

U.S. PATENT DOCUMENTS 9,264,681 B2 *   2/2016   Gish ......................... G09G 5/02
10,467,735 B2   11/2019   Pouli et al.

2006/0153445 A1 *   7/2006   Lin ......................... G06T 19/00
                                                          715/764
2007/0269132 A1   11/2007   Duan et al.
2008/0130994 A1    6/2008   Lin
2011/0123168 A1    5/2011   Cho et al.
2012/0113130 A1    5/2012   Zhai et al.
(Continued)

FOREIGN PATENT DOCUMENTS

EP        3340167 A1    6/2018

OTHER PUBLICATIONS

GB2407763.8 , "Foreign Office Action", GB Application No. GB2407763.8, Oct. 2, 2024, 6 pages.
Chan, Eric , et al., "Pursuant to MPEP § 2001.06(b) the applicant brings the following co-pending application to the Examiner's attention:", U.S. Appl. No. 18/149,995, filed Jan. 4, 2023, 64 pages.

(Continued)

*Primary Examiner* — Jacinta M Crawford
(74) *Attorney, Agent, or Firm* — FIG. 1 Patents

(57)        ABSTRACT

A high dynamic range editing system is configured to generate visualizations to aide digital image editing in both high dynamic ranges and standard dynamic ranges. In a first example, the visualization is generated as a histogram. In a second example, the visualization is generated to indicate high dynamic range capabilities. In a third example, the visualization is generated to indicate ranges of luminance values within a digital image. In a fourth example, the visualization is generated as a point curve that defines a mapping between detected luminance values from a digital image and output luminance values over both a standard dynamic range and a high dynamic range. In a fifth example, the visualization is generated as a preview to convert pixels from the digital image in a high dynamic range into a standard dynamic range.

20 Claims, 16 Drawing Sheets
(9 of 16 Drawing Sheet(s) Filed in Color)

(56)          References Cited

U.S. PATENT DOCUMENTS

| | | | |
|---|---|---|---|
| 2014/0152694 A1 | 6/2014 | Narasimha et al. | |
| 2016/0358584 A1* | 12/2016 | Greenebaum ........ | H04N 1/6088 |
| 2017/0116963 A1 | 4/2017 | Wanat et al. | |
| 2018/0005357 A1 | 1/2018 | Lasserre et al. | |
| 2018/0063500 A1 | 3/2018 | Rusanaovskyy et al. | |
| 2018/0182081 A1 | 6/2018 | Chesnokov | |
| 2018/0336669 A1 | 11/2018 | Mertens | |
| 2019/0043177 A1 | 2/2019 | Nishimura et al. | |
| 2019/0156468 A1 | 5/2019 | Yannick et al. | |
| 2019/0172187 A1 | 6/2019 | Knibbeler et al. | |
| 2019/0246043 A1 | 8/2019 | Gunji | |
| 2019/0295504 A1 | 9/2019 | Xiong et al. | |
| 2020/0013151 A1 | 1/2020 | Atkins et al. | |
| 2020/0053271 A1 | 2/2020 | Aiba | |
| 2020/0288082 A1 | 9/2020 | Matsuda | |
| 2021/0096023 A1 | 4/2021 | Yang et al. | |
| 2021/0168340 A1 | 6/2021 | Mochizuki | |
| 2021/0168344 A1 | 6/2021 | Lee et al. | |
| 2022/0044615 A1 | 2/2022 | Pytlarz | |
| 2022/0086467 A1 | 3/2022 | Messmer et al. | |
| 2022/0092749 A1 | 3/2022 | Johnson et al. | |
| 2024/0223910 A1 | 7/2024 | Chan et al. | |
| 2025/0117993 A1 | 4/2025 | Chan et al. | |

OTHER PUBLICATIONS

Chan, Eric , et al., "Pursuant to MPEP § 2001.06(b) the applicant brings the following co-pending application to the Examiner's attention:", U.S. Appl. No. 18/481,379, filed Oct. 5, 2023, 65 pages.

Chan, Eric , et al., "Pursuant to MPEP § 2001.06(b) the applicant brings the following co-pending application to the Examiner's attention:", U.S. Appl. No. 18/481,437, filed Oct. 5, 2023, 66 pages.

"Canon DP-V2730 Professional Display—Canon Europe", <www.canon-europe.com/professional-monitors/dp-v2730/>, 2022, 24 pages.

"Non-Final Office Action", U.S. Appl. No. 18/149,995, filed Apr. 10, 2025, 36 pages.

"Non-Final Office Action", U.S. Appl. No. 18/481,379, filed May 20, 2025, 16 pages.

Gore, "Understanding Your Histogram: Part 2—Color—Light and Matter", <www.lightandmatter.org/2011/general-photography-articles/understanding-your-histogram-part-2-color/>, 2011, 16 pages.

"Final Office Action", U.S. Appl. No. 18/149,995, Jul. 24, 2025, 27 pages.

"Non-Final Office Action", U.S. Appl. No. 18/149,995, Oct. 1, 2025, 35 pages.

"Final Office Action", U.S. Appl. No. 18/481,379, Sep. 16, 2025, 18 pages.

Notice of Allowance issued in U.S. Appl. No. 18/149,995, mailed Feb. 27, 2026, 17 pages.

* cited by examiner

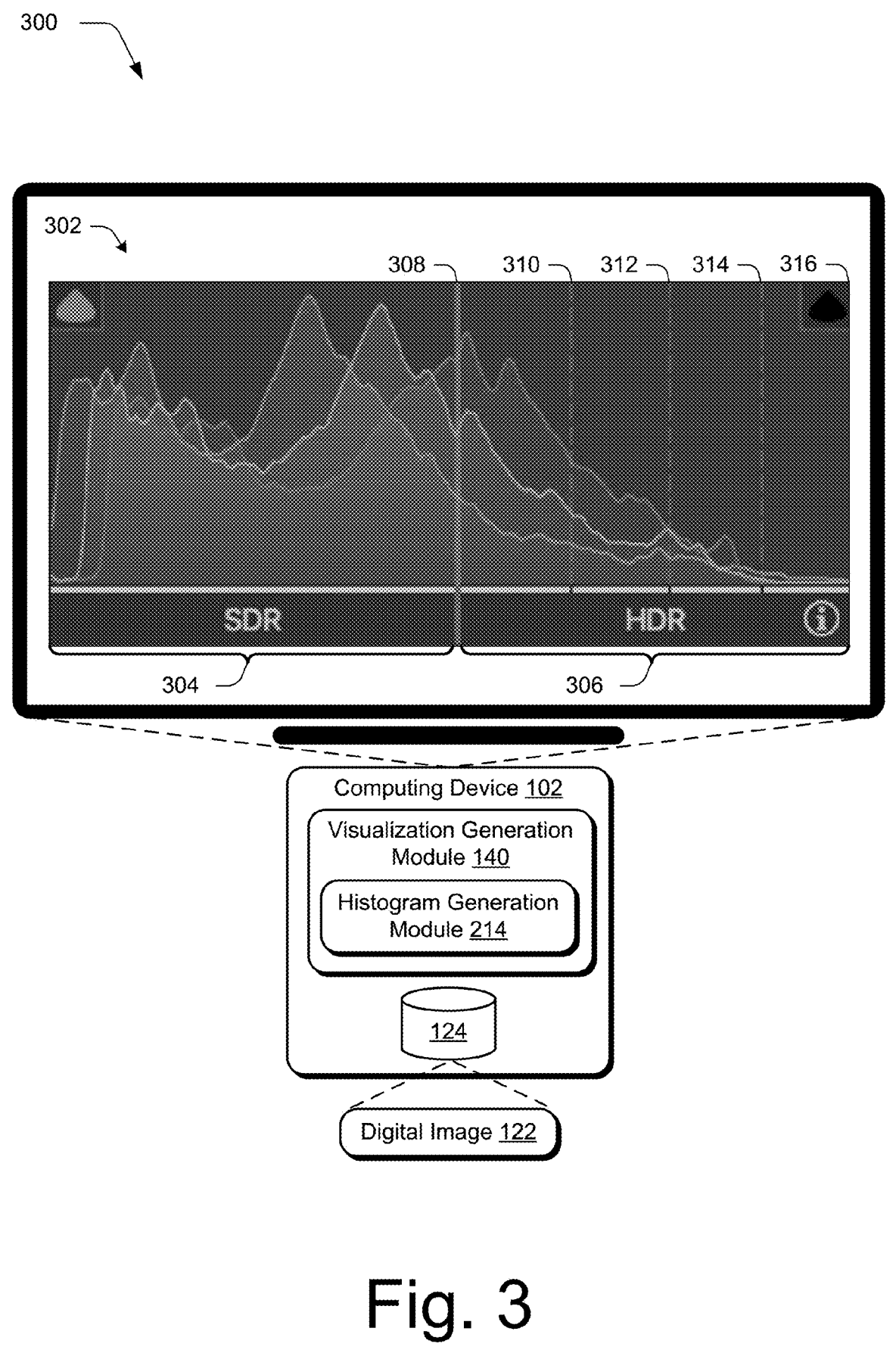

300

302

308　310　312　314　316

304　306

SDR　HDR

Computing Device 102

Visualization Generation Module 140

Histogram Generation Module 214

124

Digital Image 122

Fig. 3

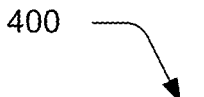

400

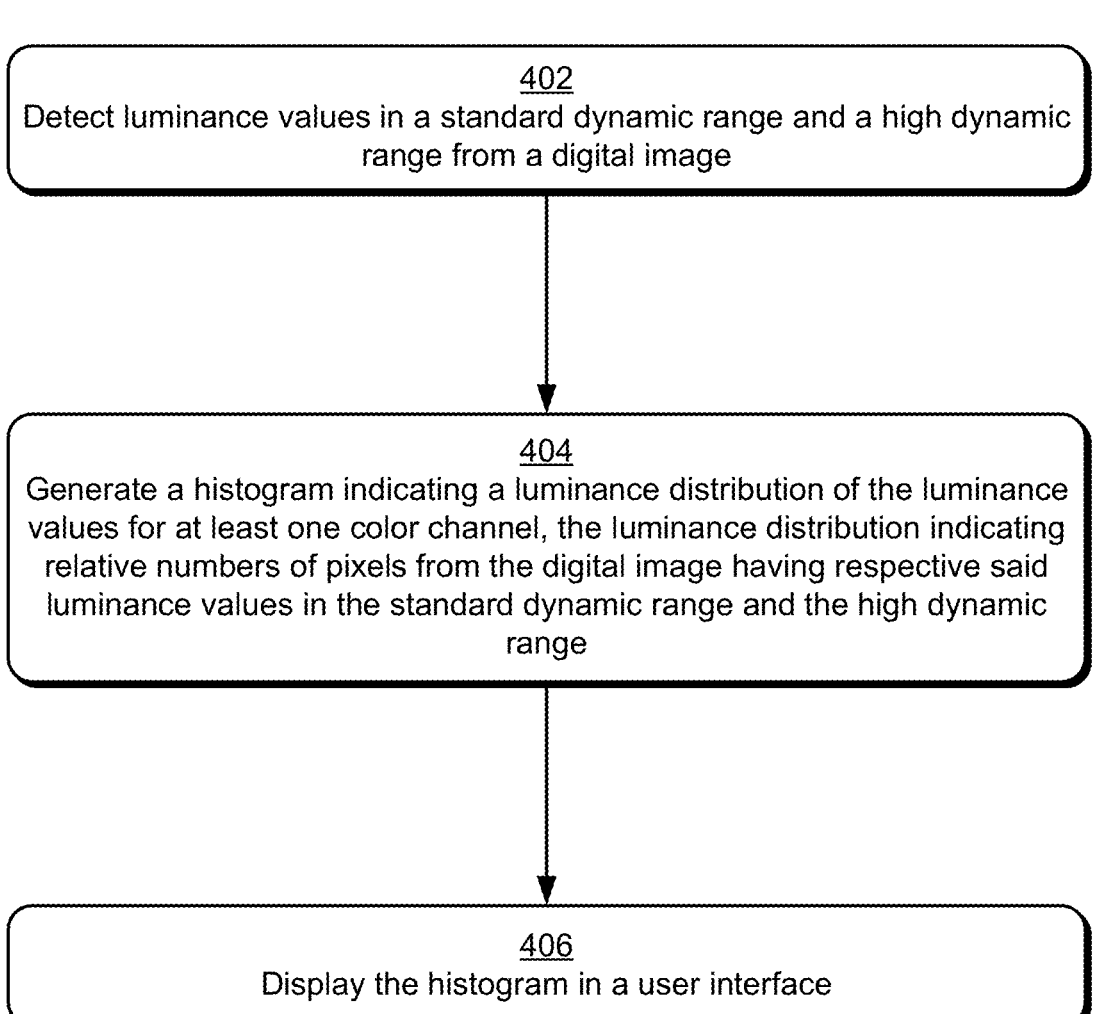

402
Detect luminance values in a standard dynamic range and a high dynamic range from a digital image

404
Generate a histogram indicating a luminance distribution of the luminance values for at least one color channel, the luminance distribution indicating relative numbers of pixels from the digital image having respective said luminance values in the standard dynamic range and the high dynamic range

406
Display the histogram in a user interface

SDR          HDR 508          510

Computing Device 102

Visualization Generation
Module 140

Capability Visualization
Module 216

124

Display Capabilities
Visualization 502

Supported
Range 504

Unsupported
Range 506

Digital Image 122

600

**Brighter Environment,
Less Headroom (1.2 stops)**

602

604

606

**Darker Environment,
More Headroom (3.1 stops)**

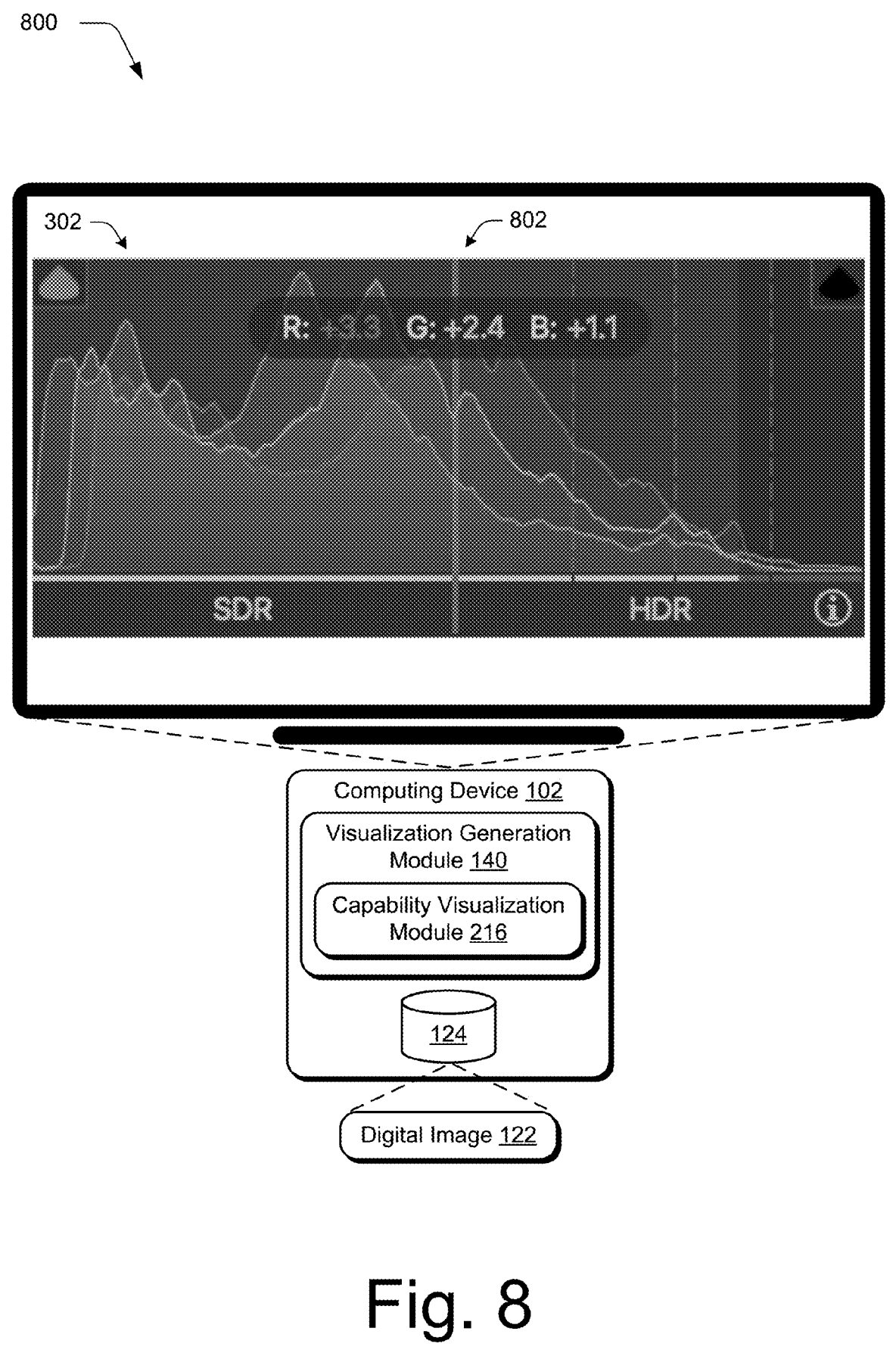

SDR                                    HDR

Computing Device 102

Visualization Generation
Module 140

Capability Visualization
Module 216

124

Digital Image 122

Fig. 8

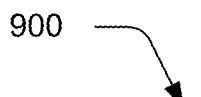

900

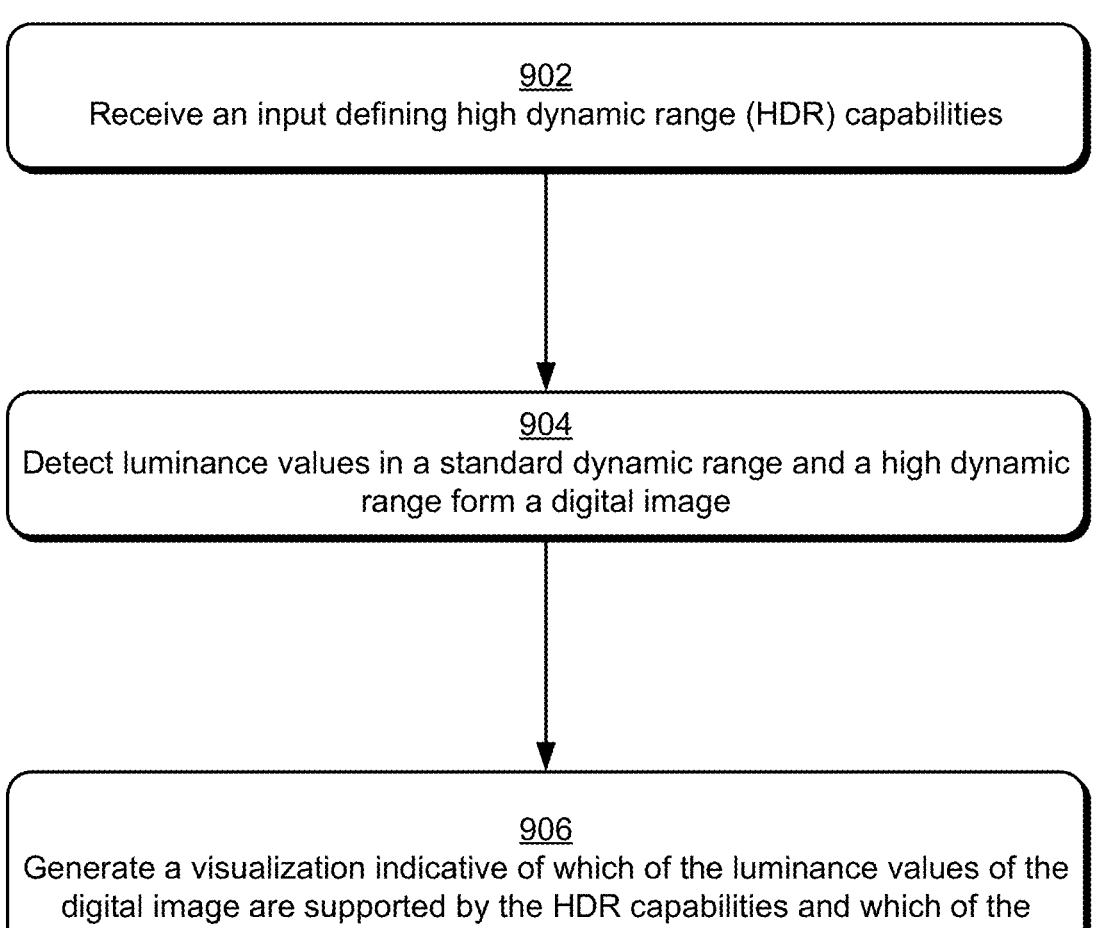

902
Receive an input defining high dynamic range (HDR) capabilities

904
Detect luminance values in a standard dynamic range and a high dynamic range form a digital image 906
Generate a visualization indicative of which of the luminance values of the digital image are supported by the HDR capabilities and which of the luminance values are not supported by the HDR capabilities

Fig. 9

1100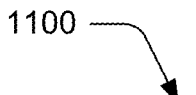

<u>1102</u>
Detect luminance values corresponding to a plurality of pixels in a digital image <u>1104</u>
Assign the luminance values to a respective range of a plurality of ranges <u>1106</u>
Designate a visual characteristic to at least one range of the plurality of ranges <u>1108</u>
Display the digital image as having the designated visual characteristic for the pixels included in the at least one range of the luminance values

Computing Device 102

Visualization Generation Module 140

Point Curve Visualization Module 220

124

Digital Image 122

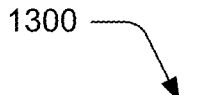
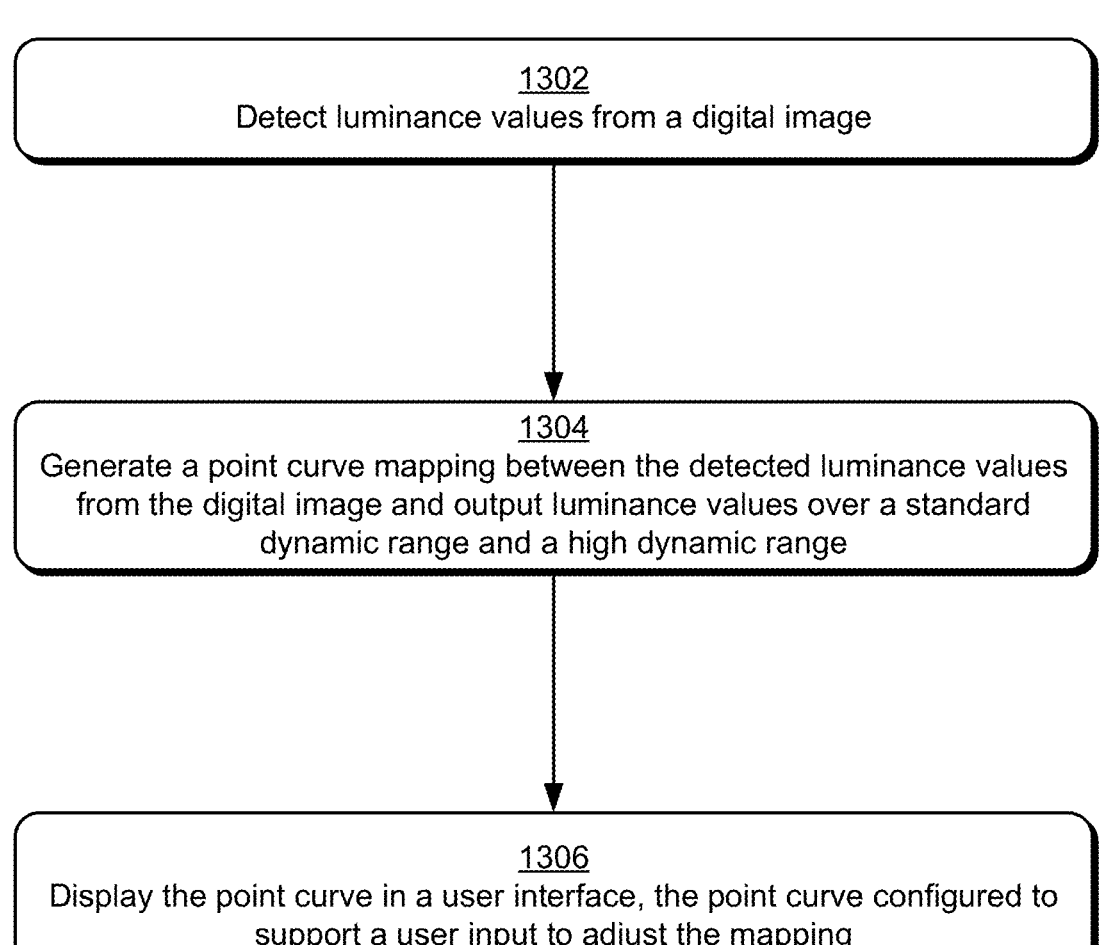
1300
1302
Detect luminance values from a digital image
1304
Generate a point curve mapping between the detected luminance values from the digital image and output luminance values over a standard dynamic range and a high dynamic range
1306
Display the point curve in a user interface, the point curve configured to support a user input to adjust the mapping
Fig. 13

1500 —

```
┌─────────────────────────────────────────────────────────────────┐
│                              1502                                 │
│   Display a digital image in a user interface by a display device │
│   using a standard dynamic range and a high dynamic range of      │
│   luminance values                                                │
└─────────────────────────────────────────────────────────────────┘
                                │
                                ▼
┌─────────────────────────────────────────────────────────────────┐
│                              1504                                 │
│   Receive an input via the user interface to display the digital  │
│   image using the standard dynamic range                          │
└─────────────────────────────────────────────────────────────────┘
                                │
                                ▼
┌─────────────────────────────────────────────────────────────────┐
│                              1506                                 │
│   Convert luminance values for pixels in the digital image in the │
│   high dynamic range into the standard dynamic range              │
└─────────────────────────────────────────────────────────────────┘
                                │
                                ▼
┌─────────────────────────────────────────────────────────────────┐
│                              1508                                 │
│   Display the digital image in the user interface as having the   │
│   converted luminance values in the standard dynamic range        │
└─────────────────────────────────────────────────────────────────┘
```

HIGH DYNAMIC RANGE VISUALIZATIONS INDICATING RANGES, POINT CURVES, AND PREVIEWS

BACKGROUND

High dynamic range (HDR) as applied to digital images refers to luminance calculations (i.e., lighting) performed in a high dynamic range that supports a larger range of values when compared with values available in a standard dynamic range (SDR). Through use of high dynamic range function- ality, bright objects in a digital image appear brighter when displayed by a display device, dark objects appear darker, and details in the digital image have increased visibility that otherwise are lost due to limitations in contrast ratios in a conventional standard dynamic range.

Conventional techniques used to implement high dynamic range functionality by display devices, however, vary between display devices and implementations used to sup- port those display devices. This variance results in incon- sistencies and reduced functionality in real world scenarios when tasked with editing these digital images.

SUMMARY

A high dynamic range editing system is configured to generate visualizations to aide digital image editing in both high dynamic ranges and standard dynamic ranges. The visualizations are configurable in a variety of ways for display in a user interface to address challenges in digital image editing that involves a high dynamic range. In a first example, the visualization is generated as a histogram. In a second example, the visualization is generated to indicate high dynamic range capabilities, e.g., as detected for a particular display device or received as a user input to define a target display device. In a third example, the visualization is generated to indicate ranges of luminance values within a digital image. In a fourth example, the visualization is generated as a point curve that defines a mapping between detected luminance values from a digital image and output luminance values over both a standard dynamic range and a high dynamic range. In a fifth example, the visualization is generated as a preview to convert pixels from the digital image in a high dynamic range into a standard dynamic range.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 3 depicts an example implementation showing gen- eration of a histogram by a histogram generation module of FIG. 2 in greater detail.

FIG. 4 is a flow diagram depicting a step-by-step proce- dure in an example implementation of operations perform- able by a processing device for accomplishing a result of generating a visualization as a histogram configured to assist editing of a digital image.

FIG. 6 depicts an example implementation of a visual- ization and histograms that show differences in headroom by a display device in supported luminance values in a high dynamic range based on environmental conditions.

FIG. 8 depicts an example implementation showing gen- eration of a visualization of display capabilities as a color coding associated with numerical values of respective color channels for a pixel by a capability visualization module of FIG. 2 in greater detail.

FIG. 9 is a flow diagram depicting a step-by-step proce- dure in an example implementation of operations perform- able by a processing device for accomplishing a result of generating a visualization as indicating high dynamic range capabilities.

FIG. 11 is a flow diagram depicting a step-by-step pro- cedure in an example implementation of operations perform- able by a processing device for accomplishing a result of generating a visualization indicative of ranges of luminance values within a high dynamic range configured to assist editing of a digital image.

FIG. 13 is a flow diagram depicting a step-by-step pro- cedure in an example implementation of operations perform- able by a processing device for accomplishing a result of generating a visualization as a point curve as a mapping between detected luminance values from a digital image and output luminance values over a standard dynamic range and a high dynamic range.

FIG. 15 is a flow diagram depicting a step-by-step pro- cedure in an example implementation of operations perform- able by a processing device for accomplishing a result of generating a visualization as a standard dynamic range preview of a high dynamic range digital image.

DETAILED DESCRIPTION

Overview

High dynamic range (HDR) has been developed to support an increased range of luminance values as part of rendering a digital image for display on a display device. However, display devices in real-world scenarios vary in an amount and types of HDR capabilities available to display the digital images, e.g., a range of luminance values supported.

Further, environmental conditions also affect HDR capabilities available from these display devices. A larger range of luminance values is typically available in dark conditions, for instance, as opposed to a range of luminance values available in bright conditions, even for the same display device. Because of this, conventional HDR techniques, when faced with these challenges, lack consistency in appearance across different display devices and in different environmental conditions, e.g., with respect to color, tone, and so forth. This results in decreased functionality including a reduction in range and accuracy of display of digital image, diminished contrast, and so forth.

Further, these challenges also directly affect functionality usable to edit the digital images. A display device used by a content editor, for example, may have different capabilities to display a digital image that supports HDR than a display device used by an end consumer. Even if using a same display device, for instance, environmental conditions at the respective display devices may differ, thereby directly affecting an ability of these display devices to display portions of a digital image in a high dynamic range.

To address these and other technical challenges, a high dynamic range editing system is configured to generate visualizations to aide digital image editing in both high dynamic ranges and standard dynamic ranges. The visualizations are configurable in a variety of ways for display in a user interface to address challenges in digital image editing that involves a high dynamic range.

In a first example, the visualization is generated as a histogram. The histogram indicates a luminance distribution of the luminance values for at least one color channel across both a standard dynamic range and a high dynamic range, further discussion of which is described and shown in relation to FIGS. 3 and 4.

Figure 7:
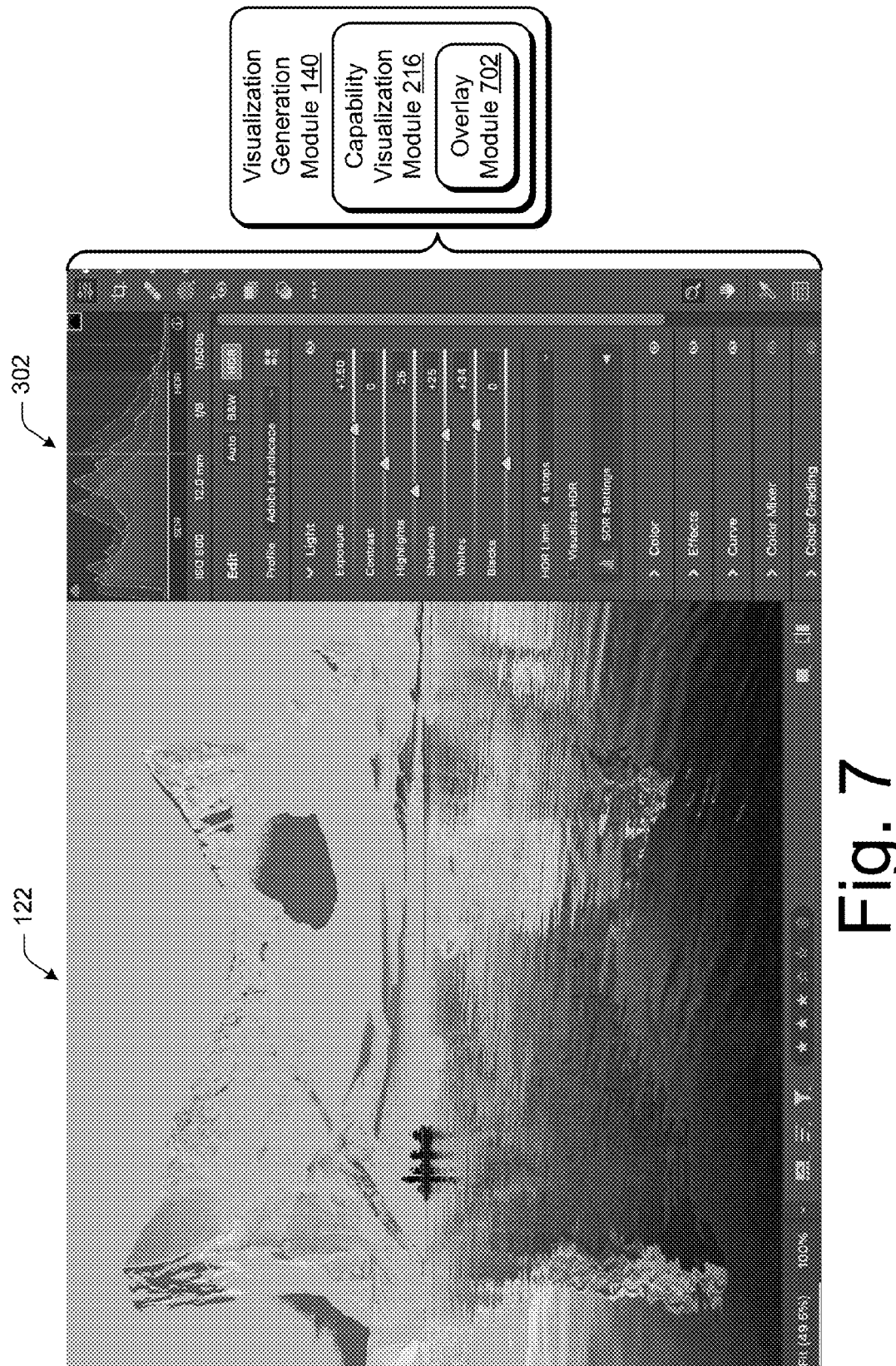
FIG. 7 depicts an example implementation showing gen- eration of a visualization of display capabilities as an overlay by a capability visualization module of FIG. 2 in greater detail.

In a second example, the visualization is generated to indicate high dynamic range capabilities, e.g., as detected for a particular display device or received as a user input to define a target display device. Examples of a display capability visualizations include indications of supported and unsupported ranges in relation to a histogram as shown in FIG. 5, differences in headroom by a same display device due to changes in environmental conditions as shown in FIG. 6, as an overlay as shown in FIG. 7, and as indicating support or lack of support for values in different color channels for a selected pixel using a display characteristic (e.g., color coding) as shown in FIG. 8.

In a third example, the visualization is generated to indicate ranges of luminance values within a digital image. A visual characteristic (e.g., color coding) is used to indicate inclusion of pixels within a respective range of luminosity values, e.g., for intervals within a high dynamic range. Further discussion of the third example is described and shown in relation to FIGS. 10 and 11.

In a fourth example, the visualization is generated as a point curve that defines a mapping between detected luminance values from a digital image and output luminance values over both a standard dynamic range and a high dynamic range. The point curve, for instance, is usable to adjust the mapping and thus output luminance values as part of generating an editing digital image. In an implementation, luminance values in the standard dynamic range are indicated in the point curve using a first scale (e.g., a linear scale) and the luminance values in the high dynamic range (HDR) are indicated in the point curve using a second scale that is different than the first scale, e.g., a logarithmic scale. Further discussion of the third example is described and shown in relation to FIGS. 12 and 13.

In a fifth example, the visualization is generated as a preview to convert pixels from the digital image in a high dynamic range into a standard dynamic range. In this way, insight is provided into how the digital image that supports a high dynamic range appears when displayed in a standard dynamic range. Further discussion of the fifth example is described in relation to FIGS. 14 and 15.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example HDR Image Editing Environment

Figure 1:
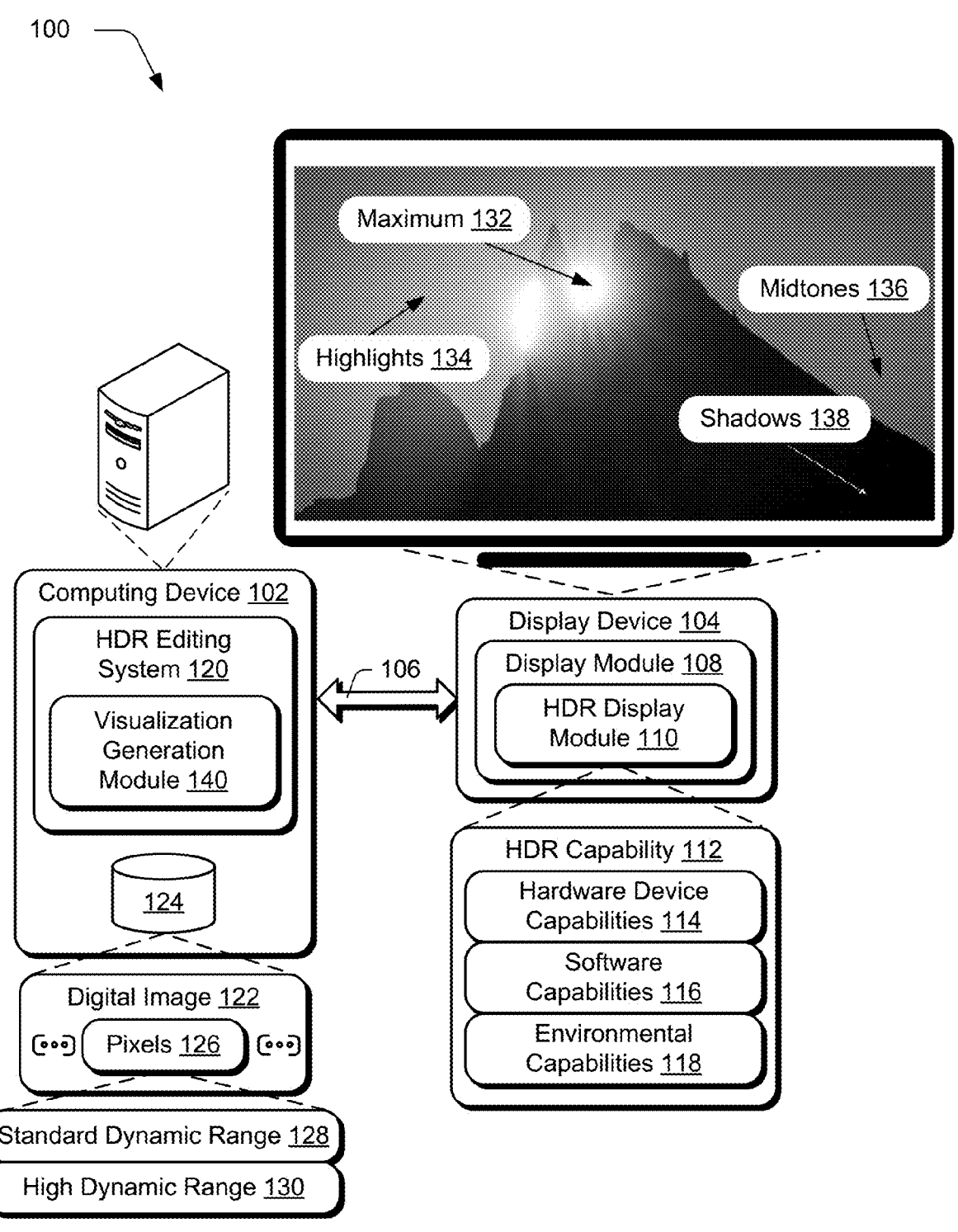
FIG. 1 is an illustration of a digital medium environment in an example implementation that is operable to employ high dynamic range digital image editing visualizations for high dynamic range digital images as described herein.

FIG. 1 is an illustration of a digital medium environment 100 in an example implementation that is operable to employ high dynamic range digital image editing visualizations for high dynamic range digital images as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 16.

A display device 104 is communicatively coupled 106 to the computing device 102, e.g., via a wired or wireless connection. The display device 104 includes a display module 108 that is representative of functionality to display digital images, e.g., static digital images, digital videos, digital documents, and so forth. The display device 104 and display module 108 are configurable in a variety of ways to incorporate a variety of display technologies, examples of which include light emitting diodes (LEDs), organic light emitting diodes (OLEDs), projectors, and so forth.

In the illustrated example, the display module 108 includes support for high dynamic range (HDR) functionality, which is represented as an HDR display module 110. High dynamic range (HDR) as applied to digital images refers to luminance calculations (i.e., lighting) performed in a high dynamic range that supports a larger range of values when compared with values available in a standard dynamic range (SDR). Through use of high dynamic range functionality, bright objects in a digital appear brighter when displayed by the display device 104, dark objects appear darker, and details have increased visibility that otherwise are lost due to limitations in contrast ratios.

An ability to support HDR capability 112 by the HDR display module 110 is dependent on a variety of capabilities, examples of which include hardware device capabilities 114, software capabilities 116, and environmental capabilities 118. The hardware device capabilities 114 are dependent on an ability of hardware of the display device 104 to support a range of luminance values, e.g., "how bright" and "how dark" pixels are activated. Software capabilities 116 refer to an ability of the display device 104 to process digital images to implement this functionality by the hardware device, e.g., support for associated drivers and so forth. Environmental capabilities 118 are dependent on environmental conditions of an environment, in which, the display device 104 is disposed, e.g., lighting conditions such as "how bright" and "how dark," glare, and so forth.

An HDR editing system 120 is implemented by the computing device 102 to edit a digital image 122, which is illustrated as stored in a storage device 124. The digital image 122, for instance, includes a plurality of pixels 126 that support a standard dynamic range 128 (SDR) and a high dynamic range 130 (HDR) of luminance values.

The term "dynamic range" refers to a contrast between the brightest and darkest tones in a digital image, which may be measured in "f-stops" that describe relative amounts of light. A digital image with under four f-stops of dynamic range, for instance, is typically considered low contrast (i.e., low dynamic range) whereas a digital image having eight or more f-stops is considered high contrast or as having a high dynamic range (HDR). Luminance refers to an amount of light shining in a particular direction, which is typically measured in candelas per square meter and is also referred to as "nits."

The illustrated digital image on the display device 104, for example, includes different amounts of light in different respective portions, from a maximum 132 nit value at the sun and decreasing values for highlights 134 (e.g., four thousand nits) to midtones 136 (e.g., one thousand nits) and to shadows 138, e.g., 100 nits. Display devices also use nits to quantify brightness. In the past, a typical display device had a maximum luminance of approximately two-hundred and fifty nits. In some current examples, mobile phones and tables support one thousand nits across an entirety of a screen, with a peak luminance of up to sixteen hundred nits. Furthermore, display devices are configurable to implement various techniques to retain deep blacks and improve contrast through use of local dimming, use of organic light emitting diodes, (OLEDs), and so forth. These display devices are referred to as an "HDR display" due to an ability to implement high peak values with deep blacks to deliver an increased range of contrast as compared with standard dynamic ranges supported by conventional display devices.

A standard dynamic range 128, for instance, is limited to a standard brightness range of a user interface. Accordingly, a digital image configured in accordance with a standard dynamic range (SDR) is incapable of a brightness greater that SDR white, which is a maximum white typically used for text, icons, menus, and other interface elements. In other words, brightness in a user interface as being limited to SDR white is similar to limitations of how photos printed on physical paper are incapable of being brighter than the paper, itself.

For a high dynamic range 130, on the other hand, tones can be brighter than SDR white and support a high dynamic range, e.g., from the dark shadows 138 of the illustrated mountain to the maximum 132 values of the sun. Accordingly, HDR capability 112 offers, in practice, an extra two to four f-stops of highlight headroom compared to a conventional display device limited to a standard dynamic range. Accordingly, tones and colors have additional room to "spread out" in support of brighter highlights, deeper shadows, improved tonal separation, and vivid color. As a result, digital images 122 that support a high dynamic range 130 for display using HDR capability 112 of the display device 104 have an increased impact and support an increased sense of depth and realism.

However, conventional techniques used to edit digital images 122 are confronted with numerous technical challenges with a digital image 122 having a high dynamic range 130. The technical challenges, for instance, include an ability to view the high dynamic range 130 based on the HDR capability 112 at the display device 104 as well as challenges when the edited digital image is to be viewed by other display devices having other HDR capabilities, e.g., hardware device capabilities, software capabilities, and environmental capabilities.

To address these technical challenges, a visualization generation module 140 is employed to generate visualizations displayable in a user interface as an aid to editing a digital image 122 and view effects of those edits. Accordingly, the techniques described herein improve device operation, increase data storage efficiency, and improve editing techniques of the digital image 122 to address different device and environmental capabilities.

Further discussion of these and other examples is included in the following section and shown in corresponding figures. In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

High Dynamic Range Digital Image Editing Visualizations

The following discussion describes high dynamic range digital image edit visualization techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Figure 2:
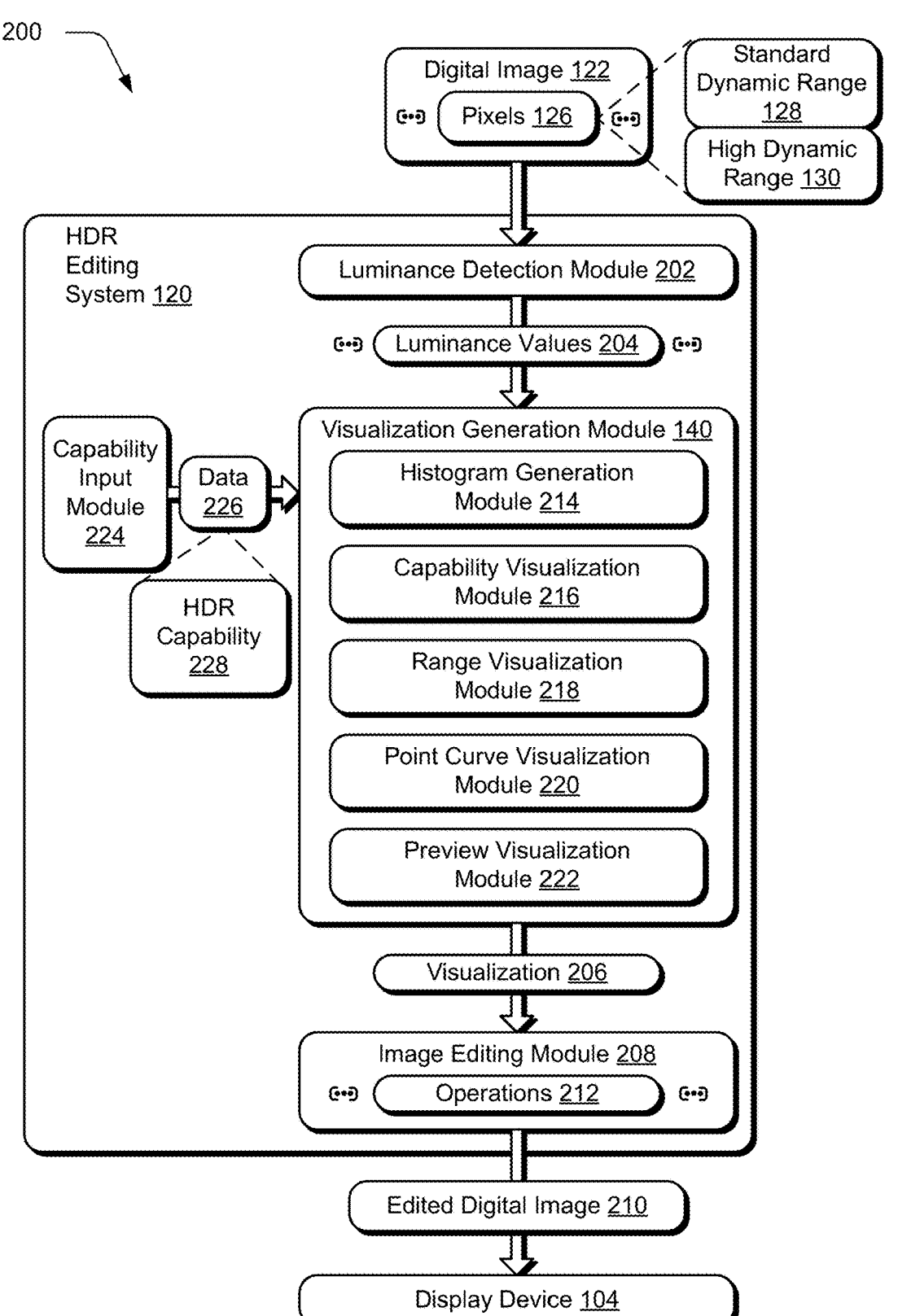
FIG. 2 depicts a system in an example implementation showing operation of an HDR editing system and visual- ization generation module of FIG. 1 in greater detail.

FIG. 2 depicts a system 200 in an example implementation showing operation of an HDR editing system and visualization generation module of FIG. 1 in greater detail. To begin in this example, a digital image is received 122 having pixels 126 in a standard dynamic range 128 and pixels 126 in a high dynamic range 130.

A luminance detection module 202 is employed by the HDR editing system 120 to detect luminance values 204 for each of the pixels 126 within the digital image 122. In a grayscale image, for instance, each pixel has a single value representing its brightness, e.g., a value of zero representing black and a maximum value of 255 representing white in an eight-bit image. For a digital image 122 having multiple color channels (e.g., RGB, HSV, CMYK, etc.), the luminance values 204 are detectable for each of the color channels. An overall luminance value may also be generated for the pixel as a whole, which may also account for sensitivity of the human eye to different color channels.

The luminance values 204 are then passed as an input to the visualization generation module 140. The visualization generation module 140 generates a visualization 206 based on the luminance values 204, which is used by an image editing module 208 in support of creating an edited digital image 210. The image editing module 208, for instance, employs one or more operations 212 to change color values of pixels 126 within the digital image within a standard dynamic range 128 as well as a high dynamic range 130, which is not possible in conventional techniques.

The visualization 206 is configurable in a variety of ways. Accordingly, techniques usable to generate the visualization 206 are also configurable in a variety of ways. Examples of functionality usable to generate the visualization 206 are represented as a histogram generation module 214, a capability visualization module 216, a range visualization module 218, a point curve visualization module 220, and a preview visualization module 222.

The histogram generation module 214 is configurable to generate the visualization 206 as a histogram. The histogram indicates a luminance distribution of the luminance values for at least one color channel across both a standard dynamic range 128 and a high dynamic range 130, further discussion of which is described and shown in relation to FIGS. 3 and 4.

The capability visualization module 216 is configured to generate the visualization 206 to indicate HDR capabilities. A capability input module 224, for instance, generates data 226 that describes an HDR capability 228 that is used as a basis to form the visualization 206 to indicate the capabilities. In a first example, the capability input module 224 detects the HDR capability 112 of a particular display device 104, which may include hardware device capabilities 114, software capabilities 116, and/or environmental capabilities 118 as previously described. In another example, the capability input module 224 is provided as a user input via a user interface, e.g., such that editing of the digital image 122 is based on the HDR capabilities of a target device that is to render the edited digital image 210.

Figure 5:
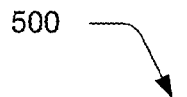
FIG. 5 depicts an example implementation showing gen- eration of a visualization of display capabilities with respect to a histogram by a capability visualization module of FIG. 2 in greater detail.
Figure 6:
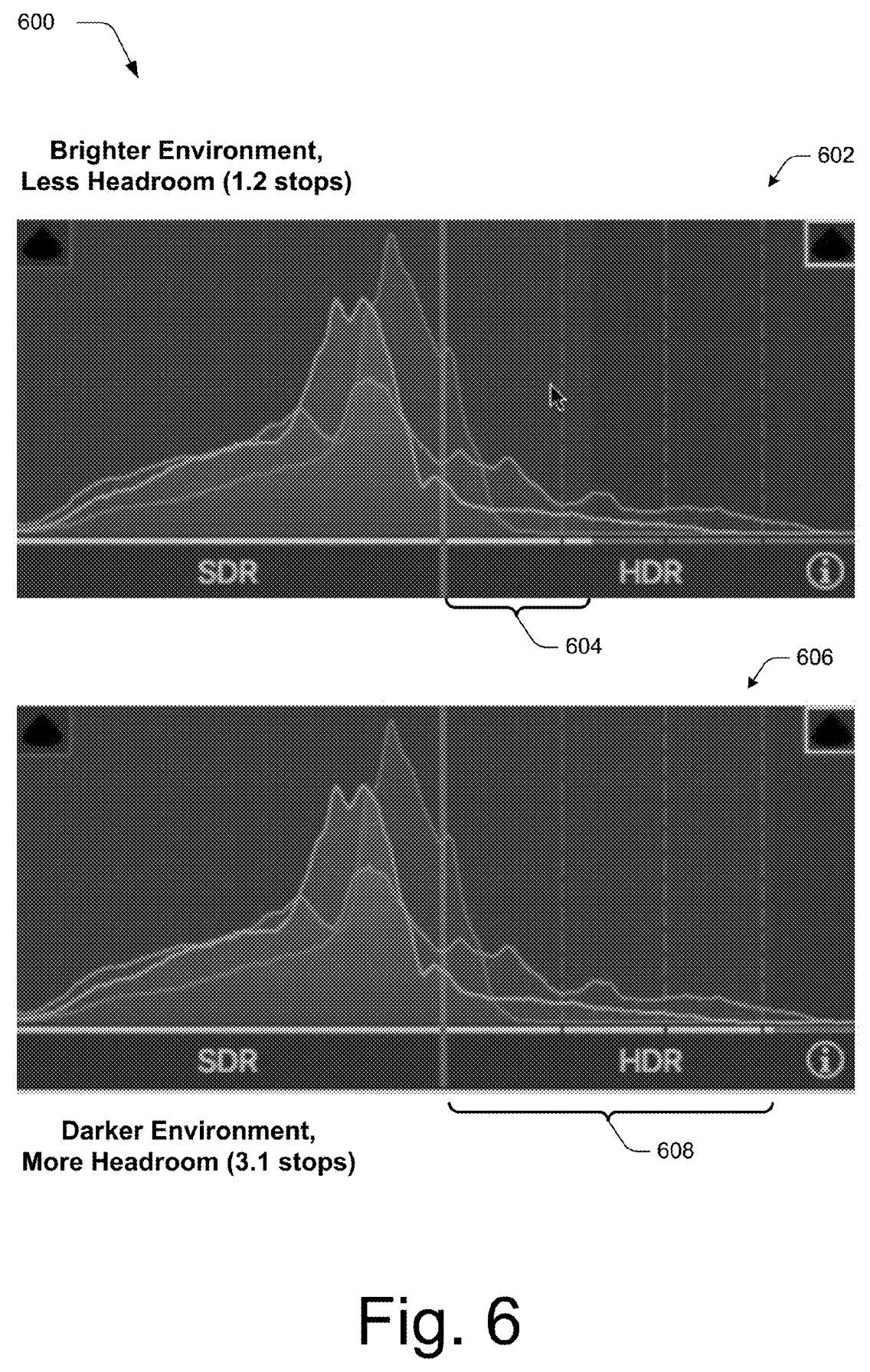

Examples of a display capability visualization include indication of supported and unsupported ranges in relation to a histogram as shown in FIG. 5, differences in headroom by a same display device due to changes in environmental conditions as shown in FIG. 6, as an overlay as shown in FIG. 7, as indicating support or lack of support for values in different color channels for a selected pixel using a display characteristic (e.g., color coding) as shown in FIG. 8, and so on as also described in relation to a procedure 900 of FIG. 9.

The range visualization module 218 is configured to generate the visualization 206 to indicate ranges of luminance values within a digital image 122. A histogram, as previously described, is configured to indicate a luminance distribution of the luminance values detected from the digital image 122, e.g., as relative numbers of pixels 126 in the digital image 122 for respective luminance values. The range visualization module 218 defines ranges of the luminance values. Ranges within the high dynamic range 130 of the histogram are associated with a respective visual characteristic, e.g., a color coding. The color coding is then also used for corresponding pixels within the digital image and thus directly indicates which pixels in the digital image are included in respective ranges within the HDR, further discussion of which is described and shown in relation to FIGS. 10 and 11.

The point curve visualization module 220 is configured to generate the visualization 206 as a point curve, which is then usable by the image editing module 208 through one or more operations 212 to make edits, e.g., adjust mapping and thus output luminance values as part of generating the edited digital image 210. The point curve defines a mapping between the detected luminance values 204 from the digital image 122 and output luminance values over both a standard dynamic range 128 and a high dynamic range 130. The point curve, for instance, is usable to adjust the mapping and thus output luminance values as part of generating an edited digital image 210. The point curve overcomes conventional technical challenges through inclusion of both the standard dynamic range 128 and the high dynamic range 130, which is not possible in conventional techniques. Further discussion of operation of the point curve visualization module 220 is described in relation to FIGS. 12 and 13.

The preview visualization module 222 is configured to generate the visualization 206 as a preview to convert pixels 126 in the high dynamic range 130 into a standard dynamic range 128. A user input, for instance, is usable to toggle a user interface between a view of the digital image 122 as displayed using a high dynamic range 130 and a view of the digital image 122 as displayed using a standard dynamic range 128. In this way, insight is provided into how the digital image 122 that supports a high dynamic range 130 appears in a standard dynamic range 128. Further discussion of operation of the point curve visualization module 220 is described in relation to FIGS. 14 and 15.

FIG. 3 depicts an example implementation 300 showing generation of a histogram by a histogram generation module 214 of FIG. 2 in greater detail. FIG. 4 is a flow diagram depicting a step-by-step procedure 400 in an example implementation of operations performable by a processing device for accomplishing a result of generating a visualization as a histogram configured to assist editing of a digital image. The luminance detection module 202, as previously described, is configured to detect luminance values 204 in a standard dynamic range 128 and a high dynamic range 130 from a digital image 122 (block 402).

The luminance values are then used by the histogram generation module 214 as a basis to generate a histogram 302 indicating a luminance distribution of the luminance values for at least one color channel. The luminance distribution indicates relative numbers of pixels from the digital image having respective luminance values in the standard dynamic range and the high dynamic range (block 404), which is displayed in a user interface (block 406).

The histogram 302, for instance, include a first axis (e.g., an X axis) indicating luminance values across a first portion corresponding to a standard dynamic range (SDR) 304 and a second portion corresponding to a high dynamic range (HDR) 306. A second axis (e.g., a Y axis) is used to indicate relative numbers of pixels from the digital image 122 having the respective luminance values, which in the illustrated example is performed for respective ones of a plurality of color channels, e.g., a red channel, a green channel, and a blue channel in an RGB color space.

A scale used in the illustrated example to depict the luminance values in the standard dynamic range 304 is different than a scale used to depict the luminance values in the high dynamic range 306. The high dynamic range 306, for instance, includes a greater range of luminance values than the standard dynamic range 304. Therefore, to "fit these in" the standard dynamic range 304 uses a linear scale in this example whereas the high dynamic range 306 uses a logarithmic scale to indicate the respective luminance values.

High dynamic range pixel values, for instance, are conventionally represented using a linear display. A pixel value of zero represents black, i.e., a minimum displayable value. A pixel value of one represents the SDR white level, i.e., a maximum displayable value of the user interface. A pixel value greater than one (e.g., "2.7") is "overrange," i.e., it is an HDR tone that is brighter than an SDR white level. This follows a linear scale in that the pixel value is proportional to the displayed energy. As a specific example, a pixel value of "8.0" is eight times brighter than a pixel value of "1.0." In photographic terms, where a "$\log_2$" scale is often used, a pixel value of "8.0" is three f-stops brighter than a pixel value of "1.0," because "$\log_2(8)=3$."

Pixel values expressed using linear light are not perceptually uniform. Therefore, user interface elements often found in image editing applications (e.g., histograms and point curves) instead use an "encoding" curve to map linear pixel values into a perceptually uniform range. These curves are designed to utilize SDR data, where the SDR range is from zero to one. Conventional examples include "sRGB," "Gamma 2.2," or Rec. "709" in which linear image values are mapped through a gamma function prior to display as part of a histogram or point curve.

Conventional user interfaces, however, do not support inclusion of HDR values. Moreover, the gamma functions previously described are not extendable, naturally, to address HDR values. For example, consider a linear set of values from "0" to "16" (e.g., up to "+4" stops brighter than SDR white) mapped using a "gamma 2.2" curve. The maximum linear value of "16" is mapped via "$16^{(1/2.2)}$" which is approximately "3.5." This means that a visualization such as a histogram or point curve interface, conventionally defined in a range of "[0,1]" for SDR would be expanded to "[0,3.5]" to support HDR data up to "+4" stops above SDR white. As a result, an HDR portion of the visualization ("1 to 3.5") is significantly larger than an SDR portion of the visualization, which is awkward and inefficient in practice.

Accordingly, in an implementation example a hybrid sRGB-logarithmic curve is employed as part of a visualization (e.g., histogram, point curve, etc.) that maps the linear range "[0,16]" to an encoded range of "[0,1]," with both SDR and HDR portions represented. The function is represented as "f(x)", where "x" is an input in linear display light (e.g., "1.0" represents SDR white). The function "f(x)" maps the SDR range "[0,1]" to the range "[0,S]" using an sRGB curve, where "s" is a configurable parameter, and maps the HDR range "[1,16]" to a range "[S,1]" using a logarithmic curve. The general form of the function "f" is definable in three parts, an example of which follows:

$$f1(x, S) = x * 12.92 * S$$

$$f2(x, S) = S * (1.055 * \text{pow}(x, 1.0/2.4) - 0.055)$$

$$f3(x, a, b, c) = a * \log(x + b) + c$$

$$f(x, S, a, b, c) = f1(x, S) \quad \text{if } (x <= 0.0031308)$$

-continued
$$f2(x, S) \quad \text{if } (x > 0.0031308 \;\&\&\; x <= 1.0)$$

$$f3(x, a, b, c) \quad \text{if } (x > 1.0)$$

The first two parts (i.e., "f1" and "f2") are the sRGB curve. The third part (f3) is a logarithmic curve.

The constants "(a, b, c)" are chosen in the above example to meet these criteria:

"f3(1)=S." In other words, "f" maps the SDR white point to the parameter "S" to ensure continuity of the function "f" where "f2" and "f3" meet;

"f3(16)=1." In other words, "f" maps a linear HDR value sixteen (i.e., four stops above SDR white) to one; and "f2'(1)=f3'(1)." In other words, a derivative of "f2" matches a derivative of "f3" when "x" is one to ensure smoothness of the function "f" where "f2" and "f3" meet.

The parameter "S" is chosen based on a desired balance between SDR and HDR in the encoded space. For example, a value of "0.5" provides an equal balance between SDR and HDR. It means that encoded values in "[0,0.5]" represent SDR and encoded values greater than "0.5" represent HDR.

Example values of (S, a, b, c) in an implementation example include:

$$S = 255.0/500.0 = 0.51$$

$$a = 0.15781$$

$$b = -0.296081$$

$$c = 0.565406$$

A variety of other examples are also contemplated.

The histogram 302 also includes an indication of a SDR white 308 as a maximum luminance value supported by the standard dynamic range 304 as a FIG. 1 indication of a transition between the standard dynamic range 304 and the high dynamic range 306. In this way, the histogram 302 indicates respective colors in the high dynamic range 306 that are brighter than colors in the standard dynamic range 304.

The high dynamic range 306 in the histogram 302 is further divided into intervals defining respective ranges of luminance values, which double over successive intervals. To do so in the illustrated example, the high dynamic range 306 is divided as f-stops, with indications at a first f-stop 310, a second f-stop 312, a third f-stop 314, and a fourth f-stop 316. As previously described, f-stops define respective amount of brightness, which were originally defined in photography as based on respective amounts of light that are permitted to pass through a lens of a camera. Thus, in this example the successive intervals define respective amounts of brightness that doubles one after another, e.g., from the first f-stop 310 to the second f-stop 312, the third f-stop 314, and the fourth f-stop 316. The histogram 302, therefore, provides insight into luminance of pixels within a digital image 122 within respective color channels and amounts of those pixels having that luminance.

FIG. 5 depicts an example implementation 500 showing generation of a visualization of display capabilities with respect to a histogram by a capability visualization module 216 of FIG. 2 in greater detail. FIG. 6 depicts an example implementation 600 of a visualization and histograms that show differences in headroom by a display device in supported luminance values in a high dynamic range based on environmental conditions. FIG. 7 depicts an example implementation 700 showing generation of a visualization of display capabilities as an overlay by a capability visualization module 216 of FIG. 2 in greater detail.

FIG. 8 depicts an example implementation 800 showing generation of a visualization of display capabilities as a color coding associated with numerical values of respective color channels for a pixel by a capability visualization module 216 of FIG. 2 in greater detail. FIG. 9 is a flow diagram depicting a step-by-step procedure 900 in an example implementation of operations performable by a processing device for accomplishing a result of generating a visualization as indicating high dynamic range capabilities.

The capability visualization module 216, as previously described in relation to FIG. 2, is configured to receive an input defining high dynamic range (HDR) capabilities (block 902). In a first example, the input is provided via a user interface. A content creator, for instance, may be tasked with creating a digital image for output by a particular display device and therefore may specify the HDR capabilities manually for that device. In a second example, a capability input module 224 detects the HDR capability 228 of an associated display device 104 in real time, which may be based on hardware device capabilities 114, software capabilities 116, environmental capabilities 118, and so on.

The luminance detection module 202, as previously described, detects luminance values 204 for a digital image 122 in a standard dynamic range 128 and a high dynamic range 130 (block 904). A visualization is then generated that is indicative of which of the luminance values of the digital image 122 are supported by the HDR capabilities and which of the luminance values are not supported by the HDR capabilities (block 906).

The visualization of FIG. 5, for instance, includes the histogram 302 of FIG. 3 as well as a display capabilities visualization 502 indicating a supported range 504 within the high dynamic range 306 and an unsupported range 506 within the high dynamic range 306. To do so in this example, a first visual indication 508 is employed using a first visual characteristic (e.g., as a color coding) over a range of luminance values with the high dynamic range 306 that shows respective values that are included in the supported range 504, e.g., through a yellow bar next to respective luminance values.

A second visual indication 510 is also employed that uses a second visual characteristic (e.g., also as a color coding in this example) over a range of luminance values with the high dynamic range 306 that shows respective values that are in the unsupported range 506, e.g., through a red bar next to the respective luminance values. Thus, in this example the first visual indication 508 indicates an amount of "headroom" available to display the digital image 122 in the high dynamic range 130. As previously described, this amount of headroom may change based on changing hardware device capabilities 114 and software capabilities 116 and even environmental capabilities 118 for a same display device, an example of which is described as follows.

FIG. 6 depicts an example implementation 600 of a visualization and histograms that show differences in headroom by a display device in supported luminance values in a high dynamic range based on environmental conditions. In a first example 602, a histogram is illustrated having a first visual indication 604 indicating an amount of "headroom" (i.e., range of luminosity values) that is available in a high dynamic range 130 in a bright environment. Because the environment is brightly lit in this example, a range available to display a digital image 122 is reduced due to an increased amount of backlight. In a second example 606 on the other hand for a dark environment, a second visual indication 608 indicates a greater amount of headroom to display the digital image 122.

Consequently, the amount of HDR headroom depends on the environment, in which, the display device 104 is disposed. The brighter the surroundings, the brighter the display, which means less available headroom. Accordingly, when in a dark environment, the overall display brightness drops, which means more headroom. Accordingly, the visualization in this example of the HDR display capabilities is usable to address changing environment conditions, changes in high dynamic range 130 of different display devices 104, view differences in target display devices, and so on. A creative professional, for instance, is provided with an ability through the visualization to view these changes and react accordingly as part of editing the digital image 122, which is not possible in conventional techniques.

FIG. 7 depicts an example implementation 700 showing generation of a visualization of display capabilities as an overlay by a capability visualization module 216 of FIG. 2 in greater detail. The capability visualization module 216 in this example includes an overlay module 702 that is configured to indicate which pixels included in a digital image 122 are supported by the HDR capabilities and which are not. A histogram 302, as previously described includes a visualization of ranges of luminosity values that are and are not supported with a high dynamic range 130 by an input defining the HDR capabilities, e.g., as user specified, as determined for a particular display device 104, and so on.

The digital image 122 is then displayed as having a visual characteristic defining which of the pixels are included in the high dynamic range 130 and are supported and which of the pixels are included in the high dynamic range 130 and are not supported. Color coding in the illustrated implementation is utilized in which yellow pixels are included in the high dynamic range 130 and are supported, whereas red pixels are included in the high dynamic range 130 and are not supported. Pixels within the standard dynamic range are taken "as is" for display in the user interface. Again, in this way, the capability visualization module 216 supports insight into a composition of the digital image 122 which is not possible using conventional techniques.

FIG. 8 depicts an example implementation 800 showing generation of a visualization of display capabilities as a color coding associated with numerical values of respective color channels for a pixel by a capability visualization module 216 of FIG. 2 in greater detail. In this example, the capability visualization module 216 receives an input selecting a particular pixel from the digital image 122. In response, the capability visualization module 216 generates a visualization 802, in conjunction with the histogram 302, that displays luminance values for the respective pixel in respective color channels, e.g., red, green, blue.

The luminance values are also displayed as having a characteristic indicating whether the respective pixels are or are not supported by the HDR capabilities. A luminance value for the red color channel for the pixel, for instance, is indicated as having a numerical value of "3.3" and is color coded in red as indicating that this luminance value is not supported by the defined HDR capabilities. Luminance values for the green and blue color channels of "2.4" and 1.1," on the other hand, are color coded in yellow as indicating that these luminance values are supported by the defined HDR capabilities, i.e., are within the first range displayed with respect to the histogram 302. Thus, in this example the visualization as an overlay directly indicates HDR support for respective pixels within a digital image 122. Similar techniques may also be used to indicate a relationship between ranges of HDR luminance values and corresponding pixels within the digital image 122, an example of which is included in the following discussion and shown in a corresponding figure.

Figure 10:
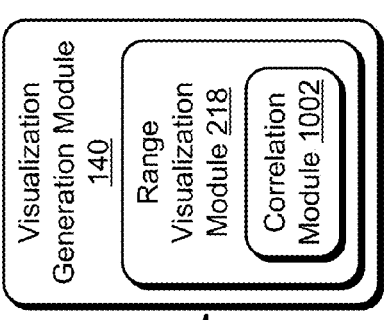
FIG. 10 depicts an example implementation showing generation of a visualization by a range visualization module of FIG. 2 in greater detail.

FIG. 10 depicts an example implementation 1000 showing generation of a visualization by a range visualization module 218 of FIG. 2 in greater detail. FIG. 11 is a flow diagram depicting a step-by-step procedure 1100 in an example implementation of operations performable by a processing device for accomplishing a result of generating a visualization indicative of ranges of luminance values within a high dynamic range configured to assist editing of a digital image.

In this example, the histogram 302 includes indications of ranges (e.g., color coded) of luminosity values within the HDR, which correspond to the first f-stop 310, second f-stop 312, third f-stop 314, and fourth f-stop 316 of FIG. 3. These indications are output in response by a correlation module 1002 of the range visualization module 218 to a selection of a "visualize HDR" option in the user interface that is circled in the illustration. Pixels associated with those ranges are then illustrated as having those indications (i.e., color coded from cyan to magenta) within the digital image 122.

Pixels of the digital image 122 within a standard dynamic range, for instance, are displayed "as is" by the range visualization module 218. Pixels of the digital image 122 in the high dynamic range, however, are displayed as having a respective visual characteristic associated with the indication of the ranges displayed with respect to the histogram 302. As a result, the user interface provides feedback regarding which ranges of luminosity values are used by respective pixels within the digital image 122. In the illustrated example, parts of the iceberg and sky are one to two stops over SDR white and are displayed in cyan and blue. Brighter areas that are three to four stops above SDR white are displayed in purple and magenta.

Thus, in this example luminance values 204 are again detected (e.g., by a luminance detection module 202) for a plurality of pixels 126 in the digital image 122 (block 1102). The luminance values 204 are then assigned to respective ranges of a plurality of ranges (block 1104) by a range visualization module 218 of the visualization generation module 140. A visual characteristic is designated by the range visualization module 218 to at least one range of the plurality of ranges (block 1106) and the digital image 122 is displayed as having the designated visual characteristic for the pixels included in the at least one range of the luminance values 204 (block 1108). As a result, the visualization in this example provides insight into HDR tones of a digital image 122 using a correlation between visual characteristics of the digital image 122 and visual characteristics of the histogram 302.

Figure 12:
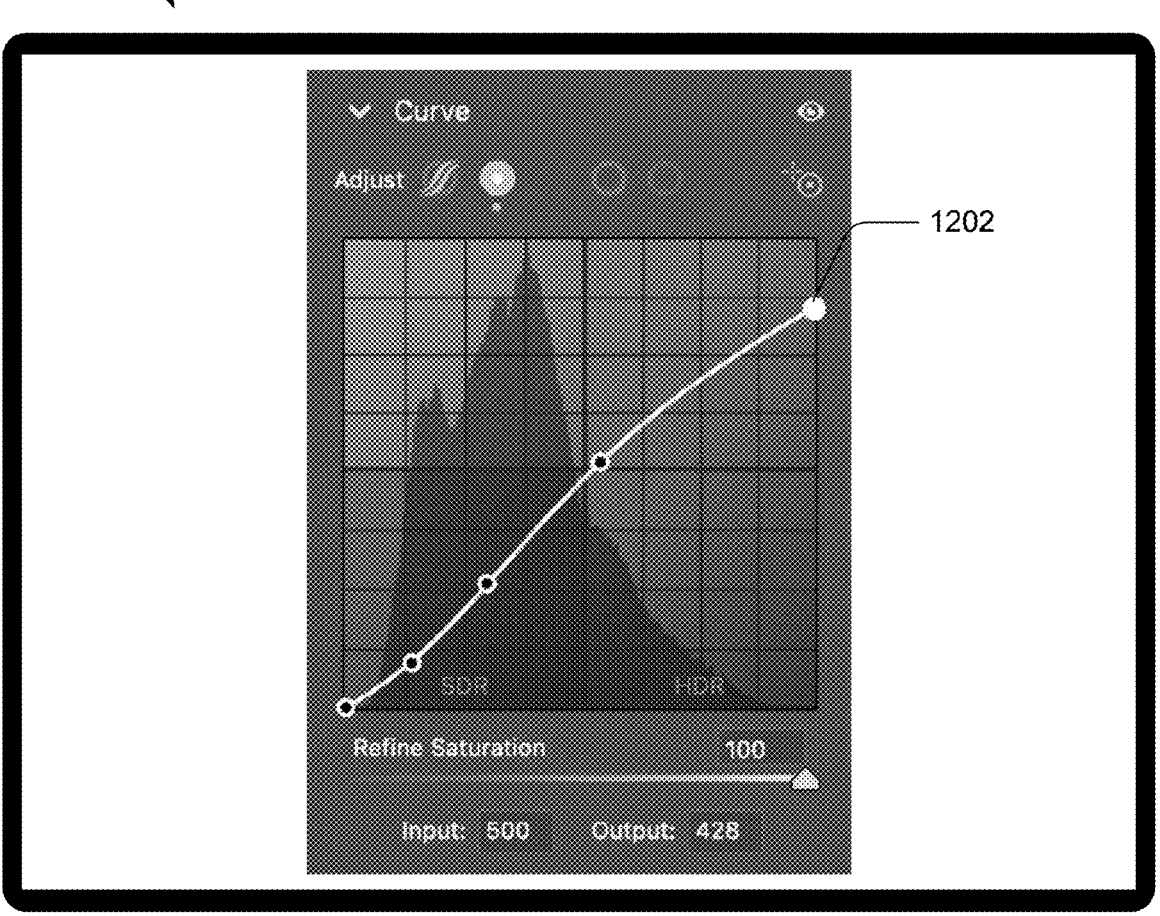
FIG. 12 depicts an example implementation showing generation of a visualization as a point curve by a point curve visualization module of FIG. 2 in greater detail.

FIG. 12 depicts an example implementation 1200 showing generation of a visualization as a point curve by a point curve visualization module 220 of FIG. 2 in greater detail. FIG. 13 is a flow diagram depicting a step-by-step procedure 1300 in an example implementation of operations performable by a processing device for accomplishing a result of generating a visualization as a point curve as a mapping between detected luminance values from a digital image and output luminance values over a standard dynamic range and a high dynamic range.

The luminance detection module 202, as before, is employed to detect luminance values 204 from the digital image 122 (block 1302). Based on these values, the point curve visualization module 220 generates a point curve 1202 as a mapping.

The point curve 1202 is user selectable, for instance, to adjust the mapping between the detected luminance values 204 from the digital image 122 and output luminance values over a standard dynamic range and a high dynamic range (block 1304), which is displayed in a user interface to support user inputs to adjust the mapping (block 1306). Points along the point curve, for instance, are user selectable to adjust output luminance values for corresponding pixels with the digital image 122.

The point curve 1202 is divided into two parts, SDR (bottom left quadrant) and HDR for the other three quadrants. The HDR section provides direct and precise control over the highlights. The center of the panel represents the SDR white level with the value of five hundred representing four f-stops above SDR white. Accordingly, a scale used in the illustrated example to depict the luminance values in the standard dynamic range is different than a scale used to depict the luminance values in the high dynamic range, like the histogram 302 of FIG. 3. The high dynamic range, for instance, includes a greater range of luminance values than the standard dynamic range. Therefore, to "fit these in" the standard dynamic range uses a linear scale in this example for the point curve 1202 whereas the high dynamic range 306 a logarithmic scale to indicate the respective luminance values.

Figure 14:
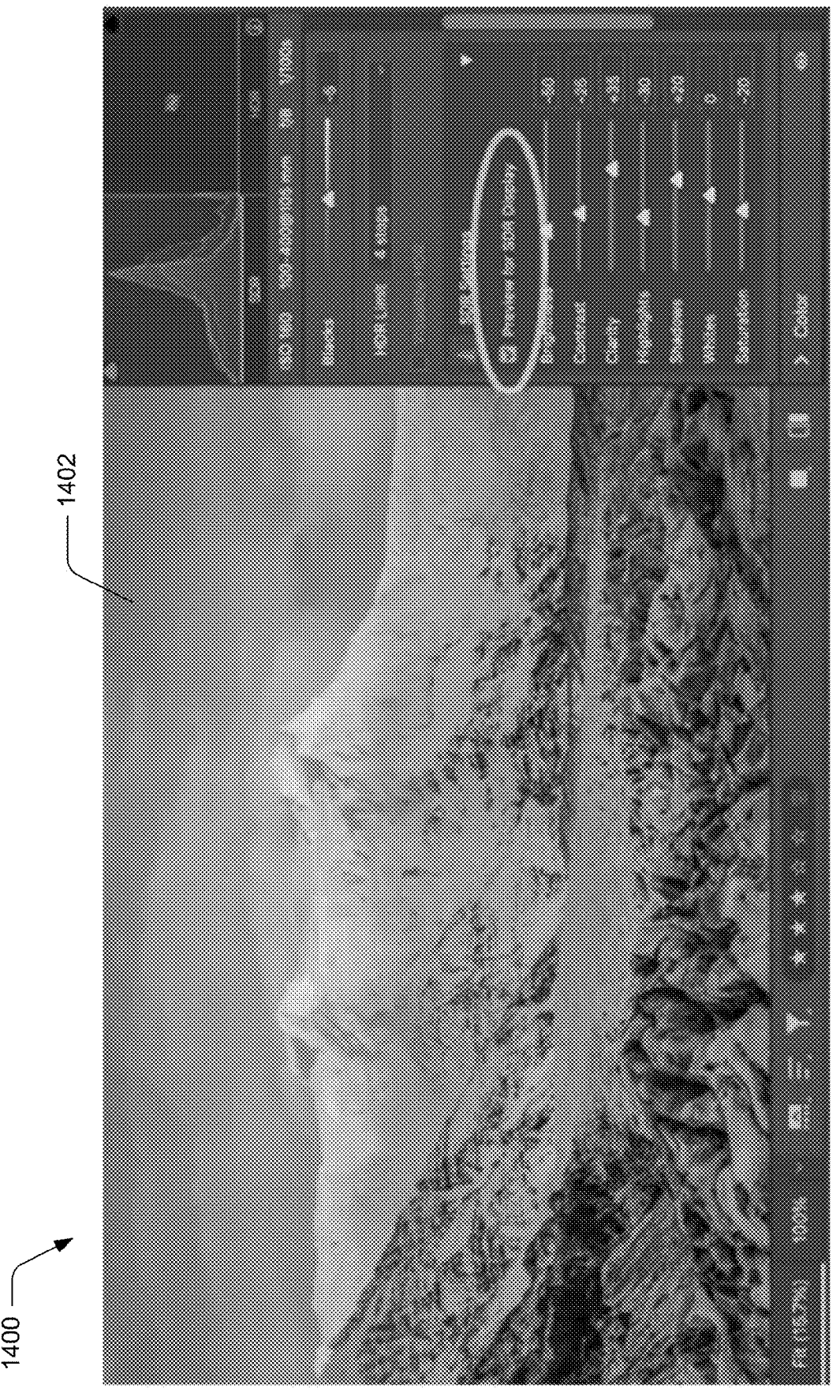
FIG. 14 depicts an example implementation showing generation of a visualization as a standard dynamic range preview of a digital image configured for output in a high dynamic range by a preview visualization module of FIG. 2 in greater detail.

FIG. 14 depicts an example implementation 1400 showing generation of a visualization as a standard dynamic range preview of a digital image configured for output in a high dynamic range by a point curve by a preview visualization module 222 of FIG. 2 in greater detail. FIG. 15 is a flow diagram depicting a step-by-step procedure 1500 in an example implementation of operations performable by a processing device for accomplishing a result of generating a visualization as a standard dynamic range preview of a high dynamic range digital image.

The preview visualization module 222 is configured to support a preview of how a digital image 122 that supports HDR capabilities will appear when displayed in a standard dynamic range. For example, as shown in the user interface 1402 of FIG. 14, a digital image 122 is displayed in the user interface 1402 by a display device using a standard dynamic range and a high dynamic range of luminance values (block 1502). An input is received via the user interface 1402 to display the digital image using the standard dynamic range (block 1504), e.g., by selecting the "Preview for SDR Display" representation. Sliders are also included to adjust tone mapping for brightness, contrast, clarity, highlights, shadows, whites, saturation, and so forth.

In response, the preview visualization module 222 converts luminance values for pixels in the digital image 122 that are in the high dynamic range into the standard dynamic range (block 1506). The digital image is then displayed in the user interface as having the converted luminance values in the standard dynamic range (block 1508). As a result, the representation supports an ability to toggle "back and forth" between display of the digital image 122 using SDR and using both SDR and HDR. A variety of other examples are also contemplated.

Example System and Device

Figure 16:
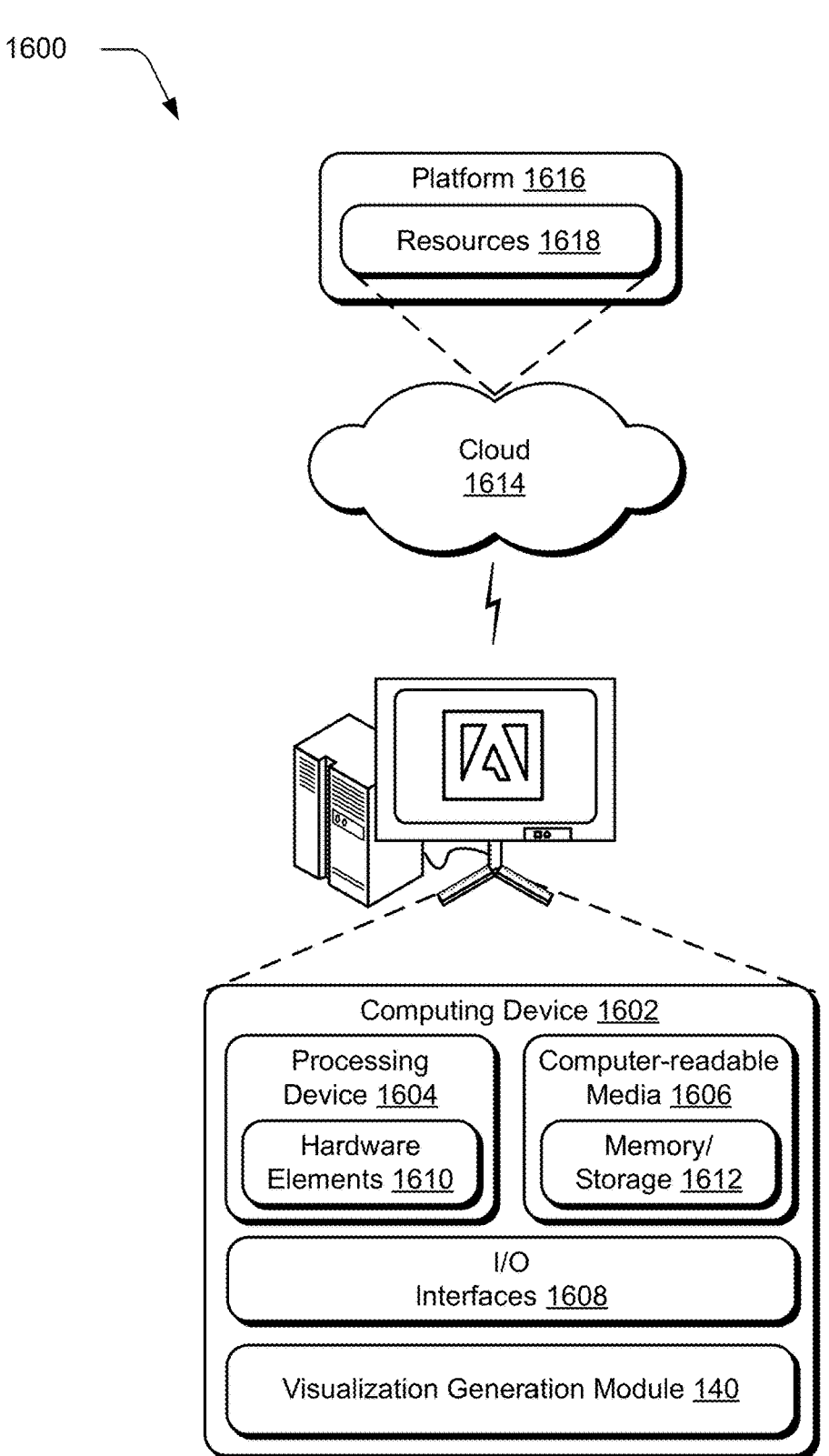
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that implement the various techniques described herein. This is illustrated through inclusion of the visualization generation module 140. The computing device 1602 is configurable, for example, as a server of a service provider, a device associated with a client (e.g., a client device), an on-chip system, and/or any other suitable computing device or computing system.

The example computing device 1602 as illustrated includes a processing device 1604, one or more computer-readable media 1606, and one or more I/O interface 1608 that are communicatively coupled, one to another. Although not shown, the computing device 1602 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1604 is representative of functionality to perform one or more operations using hardware. Accordingly, the processing device 1604 is illustrated as including hardware element 1610 that is configurable as processors, functional blocks, and so forth. This includes implementation in hardware as an application specific integrated circuit or other logic device formed using one or more semiconductors. The hardware elements 1610 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1606 is illustrated as including memory/storage 1612 that stores instructions that are executable to cause the processing device 1604 to perform operations. The memory/storage 1612 represents memory/storage capacity associated with one or more computer-readable media. The memory/storage 1612 includes volatile media (such as random access memory (RAM)) and/or nonvolatile media (such as read only memory (ROM), Flash memory, optical disks, magnetic disks, and so forth). The memory/storage 1612 includes fixed media (e.g., RAM, ROM, a fixed hard drive, and so on) as well as removable media (e.g., Flash memory, a removable hard drive, an optical disc, and so forth). The computer-readable media 1606 is configurable in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1602. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1610. The computing device 1602 is configured to implement particular instructions and/or functions corresponding to the software and/or hardware modules. Accordingly, implementation of a module that is executable by the computing device 1602 as software is achieved at least partially in hardware, e.g., through use of computer-readable storage media and/or hardware elements 1610 of the processing device 1604. The instructions and/or functions are executable/operable by one or more articles of manufacture (for example, one or more computing devices 1602 and/or processing devices 1604) to implement techniques, modules, and examples described herein.

The techniques described herein are supported by various configurations of the computing device 1602 and are not limited to the specific examples of the techniques described herein. This functionality is also implementable all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 abstracts resources and functions to connect the computing device 1602 with other computing devices. The platform 1616 also serves to abstract scaling of resources to provide a corresponding level of scale to encountered demand for the resources 1618 that are implemented via the platform 1616. Accordingly, in an interconnected device embodiment, implementation of functionality described herein is distributable throughout the system 1600. For example, the functionality is implementable in part on the computing device 1602 as well as via the platform 1616 that abstracts the functionality of the cloud 1614.

In implementations, the platform 1616 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

18

What is claimed is:

1. A method comprising:
   detecting, by a processing device, luminance values corresponding to a plurality of pixels having a plurality of color values in a digital image;
   assigning, by the processing device, the luminance values to a respective range of a plurality of ranges;
   designating, by the processing device, a visual characteristic of a plurality of visual characteristics to respective pixels of the plurality of pixels based on a respective assigned range of the plurality of ranges; and
   displaying, by the processing device, the digital image as having the designated visual characteristic for one or more of the plurality of pixels in place of one or more of the plurality of color values for the plurality of pixels.

2. The method as described in claim 1, wherein the luminance values are included in a standard dynamic range and a high dynamic range.

3. The method as described in claim 1, wherein the designated visual characteristic is a color coding such that a first said range is assigned a first said color and a second said range is assigned a second said color.

4. The method as described in claim 1, further comprising receiving an input defining high dynamic range (HDR) capabilities as corresponding to a respective said range and wherein the displaying is based on the high dynamic range (HDR) capabilities.

5. The method as described in claim 4, wherein:
   a first said visual characteristic is assigned to a first said range of luminance values within a high dynamic range that are supported by the high dynamic range (HDR) capabilities; and
   a second said visual characteristic is assigned to a second said range of luminance values within the high dynamic range that are not supported by the high dynamic range (HDR) capabilities.

6. The method as described in claim 4, wherein the high dynamic range (HDR) capabilities are detected based on hardware device capabilities of the display device.

7. The method as described in claim 4, wherein the high dynamic range (HDR) capabilities are detected based on environmental capabilities of an environment, in which, a display device is disposed.

8. The method as described in claim 4, wherein the displaying includes pixels taken from the digital image having luminance values within a standard dynamic range.

9. The method as described in claim 1, wherein the displaying includes a histogram as having the visual characteristics displayed in a user interface with the digital image along with a representation of at least one operation that is user selectable to edit the digital image and display a corresponding change to the histogram in real time.

10. A computing device comprising:
   a processing device; and
   a computer-readable storage medium storing instructions that, responsive to execution by the processing device, causes the processing device to perform operations including:
      detecting luminance values corresponding to a plurality of pixels in a digital image based on color values for the plurality of pixels, respectively;
      assigning the luminance values to a respective range of a plurality of ranges, the plurality of ranges including a high dynamic range and a standard dynamic range;
      designating a visual characteristic of a plurality of visual characteristics to respective pixels of the plurality of pixels based on a respective assigned range of the plurality of ranges in which at least one range of the plurality of ranges includes a plurality of the luminance values assigned to a single said visual characteristic; and displaying the digital image as having the designated visual characteristic for the respective pixels as replacing one or more of the color values for one or more of the plurality of pixels.

11. The computing device as described in claim 10, wherein the designated visual characteristic is a color coding such that the standard dynamic range is assigned a first said color and the high dynamic range is assigned a second said color.

12. The computing device as described in claim 10, further comprising receiving an input defining high dynamic range (HDR) capabilities available for the high dynamic range and wherein the displaying is based on the high dynamic range (HDR) capabilities.

13. The computing device as described in claim 12, wherein:

a first said visual characteristic is assigned to a first said range of luminance values within a high dynamic range that are supported by the high dynamic range (HDR) capabilities; and a second said visual characteristic is assigned to a second said range of luminance values within the high dynamic range that are not supported by the high dynamic range (HDR) capabilities.

14. The computing device as described in claim 12, wherein the high dynamic range (HDR) capabilities are detected based on hardware device capabilities of the display device.

15. The computing device as described in claim 14, wherein the high dynamic range (HDR) capabilities are detected based on environmental capabilities of an environment, in which, a display device is disposed.

16. The computing device as described in claim 10, wherein the displaying includes pixels taken from the digital image having luminance values within a standard dynamic range.

17. A method comprising:

detecting, by a processing device, luminance values based on a plurality of color values corresponding to a plurality of pixels in a digital image;

receiving, by the processing device, an input defining high dynamic range (HDR) capabilities;

designating, by the processing device, a visual characteristic to respective pixels of the plurality of pixels unsupported by the high dynamic range (HDR) capabilities; and displaying, by the processing device, the digital image as having the designated visual characteristic for the respective pixels in place of one or more of the plurality of color values for one or more pixels of the plurality of pixels in the digital image.

18. The method as described in claim 17, further comprising assigning another visual characteristic to respective pixels of the plurality of pixels supported by the high dynamic range (HDR) capabilities.

19. The method as described in claim 17, wherein the visual characteristic is a color coding.

20. The method as described in claim 17, wherein the high dynamic range (HDR) capabilities are detected based on hardware device capabilities of a display device or environmental capabilities of an environment, in which, the display device is disposed.

* * * * *